US006535164B2

(12) United States Patent
Imazeki et al.

(10) Patent No.: US 6,535,164 B2
(45) Date of Patent: Mar. 18, 2003

(54) EACH AREA AUTOMATIC SELECTION RECEIVER FOR EMERGENCY RADIO SIGNAL

(75) Inventors: Kazuyoshi Imazeki, Tokyo (JP); Masaki Hiratsuka, Tokyo (JP); Nobuaki Yokoyama, Tokyo (JP)

(73) Assignee: General Research of Electronics, Inc., Tokyo (JP)

( * ) Notice: Subject to any disclaimer, the term of this patent is extended or adjusted under 35 U.S.C. 154(b) by 0 days.

(21) Appl. No.: 09/899,476

(22) Filed: Jul. 5, 2001

(65) Prior Publication Data

US 2002/0145558 A1 Oct. 10, 2002

(51) Int. Cl.$^{7}$ .......................... H04B 7/185; G01W 1/00
(52) U.S. Cl. .............. 342/357.17; 340/601; 342/357.06
(58) Field of Search ....................... 342/357.06, 357.17; 455/456; 340/601

(56) References Cited

U.S. PATENT DOCUMENTS 5,625,668 A * 4/1997 Loomis et al. ........... 342/357.1
5,727,057 A * 3/1998 Emery et al. ............... 455/456
6,112,074 A * 8/2000 Pinder ........................ 455/456
6,121,885 A * 9/2000 Masone et al. ............. 340/628
6,177,873 B1 * 1/2001 Cragun ....................... 340/601
6,204,761 B1 * 3/2001 Vanderable ................. 340/601
6,278,375 B1 * 8/2001 Hucker ....................... 340/601
6,323,767 B1 * 11/2001 Gropper ..................... 340/534
6,329,904 B1 * 12/2001 Lamb ........................ 340/286.02
6,385,465 B1 * 5/2002 Yoshioka .................... 455/456
2002/0034954 A1 * 3/2002 Nohara et al. .............. 455/456
2002/0075155 A1 * 6/2002 Guillory ..................... 340/601
2002/0097161 A1 * 7/2002 Deeds ........................ 340/601

FOREIGN PATENT DOCUMENTS

EP 1187038 A2 * 3/2002 ........... G06F/17/30
JP 2002-82863 A * 3/2002 ........... G06F/13/00

OTHER PUBLICATIONS

Alert AM: Emergency Advisory Radio System brochure, Information Station Specialists, Inc., http:// www.theradio-source.com/Downloads/alert_am_overview.pdf, 2002.*

* cited by examiner

*Primary Examiner*—Thomas H. Tarcza
*Assistant Examiner*—Fred H. Mull
(74) *Attorney, Agent, or Firm*—Flynn, Thiel, Boutell & Tanis, P.C.

(57) ABSTRACT

An each area automatic selection receiver of an emergency radio signal is an emergency broadcast receiver which enables current area code CAC to be updated automatically. This receiver is constituted in such a way that a GPS receiver obtains current position information by use of the satellite positioning system, then, a converter converts the current position information into an area code by use of a conversion table to write the area code into a code memory. For that reason, even though the receiver moves anywhere, contents of the code memory are always updated to an area code of an area of the movement destination automatically. Therefore, emergency broadcast of the area is always capable of being received correctly.

7 Claims, 2 Drawing Sheets

EACH AREA AUTOMATIC SELECTION RECEIVER FOR EMERGENCY RADIO SIGNAL

BACKGROUND OF THE INVENTION

1. Field of the Invention

The present invention relates to an each area automatic selection receiver for an emergency radio signal, more particularly the present invention relates to an improvement of a receiver capable of automatically establishing an area code in order to automatically receive an emergency radio signal for specific area with a mobile receiver and so forth particularly.

2. Description of the Related Art

Disaster information is mainly issued when extraordinary phenomena in heaven and earth and so forth occur. The disaster information has considerable regional differences caused by the weather, geographical features and so forth. In order to solve the regional differences, not only public broadcast for the general public is performed, but also emergency broadcast for every area is frequently performed. This emergency broadcast firstly transmits area code RAC (Received Area-Code) for specifying signal distributed area before radio broadcasting of this emergency broadcast. When the reception code RAC agrees with an area code AC (Area-code) input in a receiver beforehand, only the receiver is capable of receiving the emergency broadcast. As a result, an alarm announcement is issued and simultaneous reception operation of the receiver is automatically started.

FIG. 2 is a conventional constitution example of an each area automatic selection receiver for an emergency broadcast whose signal distributed area described-above is specified.

Each area emergency broadcasting radio wave is sent to specific area in accordance with an area code. For instance, the administration of the United States of America (NWS) executes Specific Area Message Encoding Service that sends radio wave SAME. The radio wave SAME is an emergency message depending on a code sequence including a digital code determined previously corresponding to characteristic of the message. The receiver A in FIG. 2 selectively receives the each area emergency broadcast radio wave such as the radio wave SAME to output. The receiver A comprises a demodulator 1 for performing demodulation while receiving input radio wave, a decoder 2 for detecting digital data reception message RD included in demodulation output RS and the area code RAC showing signal distribution area of this area code, a area code comparator 4 for comparing this area code with an area code CAC (Current Area Code) in connection with desired reception area that is supplied to be written in a code memory 3, followed by judging agreement thereof in accordance with judgment condition determined beforehand, and an output driver 5 for outputting voice, indication, alarm sound and so forth corresponding to reception message (data) which are supplied from a decoder to exterior while receiving judgment output "enable" E of agreement of the area code comparator 4.

In FIG. 2, the automatic selection receiver A is illustrated by dotted line frame. A digital data signal RS is demodulated by the demodulator 1 of the automatic selection receiver A. The demodulated digital data signal RS is input to the decoder 2. The area code RAC and the emergency message signal RD including voice, indication, alarm sound and so forth are obtained from the decoder 2. The area code RAC is input to the area code comparator 4.

On the other hand, also the area code CAC stored in the code memory 3 with manually input is input to the area code comparator 4. The area code CAC is compared with the received area code RAC. When the area code CAC agrees with the area code RAC, output driver 5 turns ON while outputting enable signal. The aforementioned emergency message signal is output.

As is clear described above, in the conventional system, there is no problem in connection with fixed receiver, however, in the equipment that moves over large area such as mobile equipment and so forth, it is necessary to rewrite the area code AC within the code memory in every movement. It is very complicated, there is fear that error writing occurs.

SUMMARY OF THE INVENTION

The present invention has been made in consideration of the above-mentioned problem, and an object of the present invention is to provide an automatic selection receiver by area of emergency radio signal in which an area code of desired reception area (current area code) CAC is automatically rewritten even though reception point moves anywhere.

In order to achieve the aforementioned problem, an each area automatic selection receiver of an emergency radio signal of the present invention is a receiver for receiving an each area emergency broadcast electric wave, and the receiver detects an area code of indicating distributed area of a reception message which is in modulation to be output, followed by outputting the reception message when agreeing the detected area code with an established area code of current position where the receiver exists, the receiver includes receiving means for GPS (Global Positioning System) signal, first means for obtaining an established area code of the current position corresponding to the GPS signal, and second means for supplying the established area code to the receiver.

In the present invention, the receiver is made to constitute in such a way that the first means have an area code reference table for converting position data corresponding to reception position obtained from the GPS signal into the established area code, and the second means have a memory for storing the established area code.

BRIEF DESCRIPTION OF THE DRAWINGS

The various features of novelty which characterize the invention are pointed out with particularly in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

DETAILED DESCRIPTION OF THE PREFERRED EMBODIMENT

The global positioning system (GPS) managed by the Administration of the United States of America is widely used for the purpose of measuring accurate position on geographical features where the receiver is placed. If the satellite positioning system is used, position data of the receiver can be obtained easily. Therefore, if the table for converting this position data into the aforementioned area code CAC is used, it is possible to immediately obtain the area code CAC corresponding to current place of the emergency receiver. Consequently, it is suitable that this area code CAC is made to store in a memory, when obtaining new area code in accordance with movement of the receiver, content of the memory is automatically rewritten to the new area code by the rewriting means. Accordingly, if the appropriate rewriting means is added to the receiver A, the object of the present invention is achieved.

A preferred embodiment of the automatic selection receiver by area for an emergency radio signal according to the present invention will be described referring to FIG. 1 below.

Figure 1:
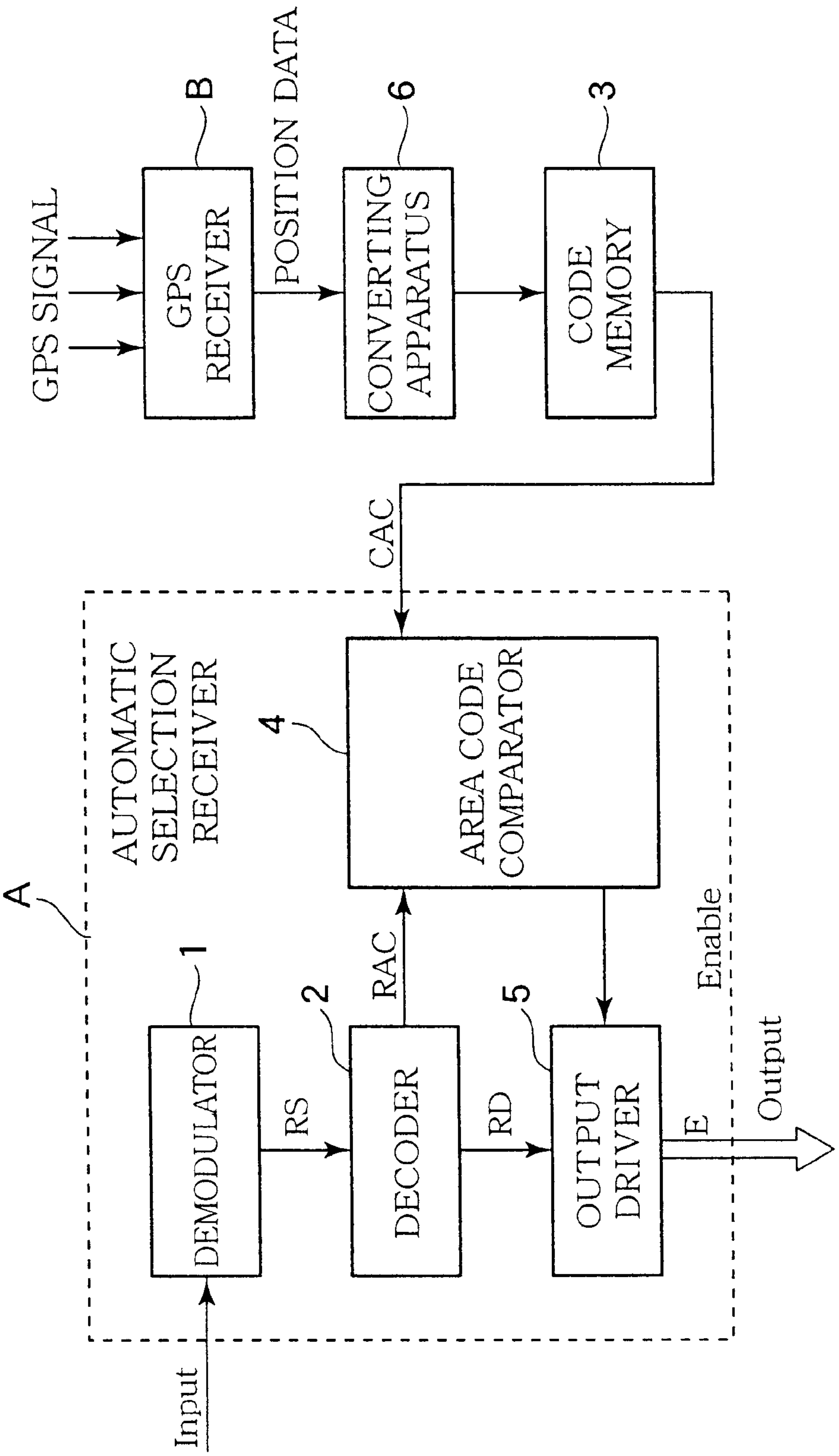
FIG. 1 is a circuit constitution view for performing operation explanation of an emergency broadcast receiver according to the present invention.
Figure 2:
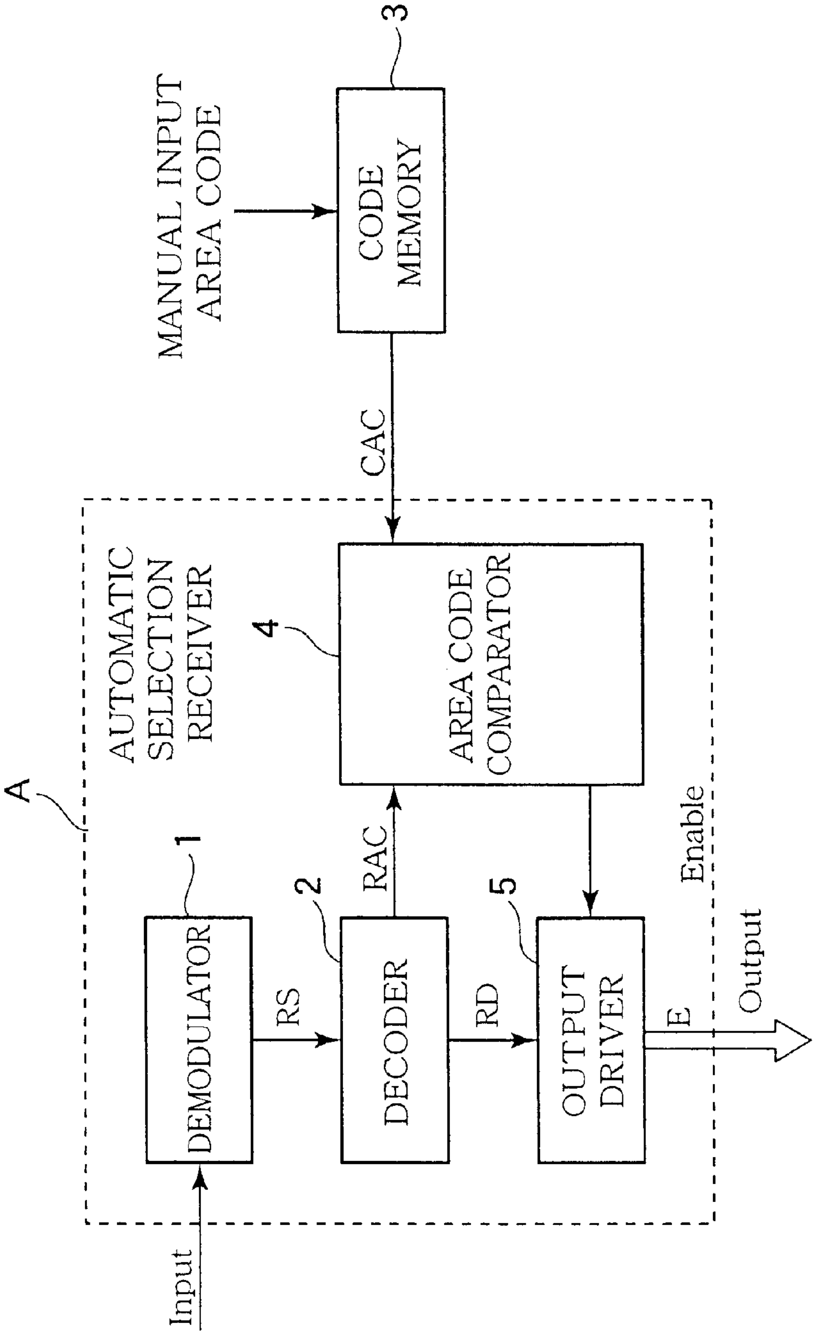
FIG.2 PRIOR ART
FIG. 2 is a circuit constitution view for performing operation explanation of a conventional emergency broadcast receiver.

As is clear from FIG. 1, part of receiver A is the same as that of FIG. 2. A receiver B is a known receiver of GPS signal. The receiver B obtains position data of the radio electric wave by area that corresponds to reception position on the geographical features. This position data is input to a conversion apparatus 6. The conversion apparatus converts the area code into an area code of the desired reception area (Current Area Code) CAC by use of the area code reference table (Code Reference Table). The code memory 3 stores therein the converted CAC. At the same time, the converted CAC is input to the area code comparator 4.

As described above, according to the present invention, a receiver is made to constitute in such a way as to add a GPS receiver and to utilize the position data of the GPS. Thereby, even though the receiver moves anywhere, contents of the code memory are always updated to the area code CAC of the current area automatically. Therefore, it is always possible to receive the emergency broadcast of this area correctly.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. In an each area automatic selection receiver of an emergency radio signal for receiving each area emergency broadcast electric wave comprising:

a demodulator for performing demodulation while receiving an input radio wave;

a decoder for detecting a digital data reception message included in a demodulation output of said demodulator and detecting an area code signal distribution area for a received area code;

an area code comparator for comparing the received area code with a current area code in connection with a desired reception area which is stored in a code memory and for judging agreement thereof in accordance with a predetermined judgment condition;

an output driver for outputting at least one of a voice warning, an indication warning, or other alarm sound corresponding to said reception message in response to a judgment output of agreement of said area code comparator;

the improvement comprising a receiver for receiving a GPS signal to obtain position data corresponding to reception position of the GPS signal; and a conversion apparatus for converting the position data to adjust the current area code of the desired reception area by use of an area code reference table and storing the adjusted current area code in said code memory.

2. An area automatic selection receiver for receiving an area emergency broadcast electric wave utilizing a specific area message encoding scheme comprising:

a global position signal receiver for receiving a global position signal and generating position data corresponding to the reception location of the position signal;

a converting apparatus for receiving the position data and utilizing a specific area message encoding table provided in a memory to output an area code corresponding to the position data;

a demodulator for receiving and demodulating an area emergency broadcast electric wave, and outputting demodulated signals;

a decoder for receiving and decoding the demodulated signals to provide a specific area code and an emergency message, the specific area code corresponding to one of the codes from the specific area message encoding scheme;

an area code comparator for comparing the specific area code with the area code corresponding to the position data and providing an enable signal when the area codes match indicating that an emergency condition is present in the area corresponding to the specific area code where said receiver is located; and an output driver for receiving the enable signal indicating the emergency condition, said output driver outputting the emergency message in response to receipt of the enable signal, wherein said global position signal receiver and said converting apparatus automatically update the position data and the area code corresponding to the position data, and automatically provide the area code corresponding to the position data to the area code comparator.

3. The receiver of claim 2, wherein at least some of the specific area codes represent specific counties within a state.

4. The receiver of claim 2, wherein the emergency message output by said output driver comprises a voice message.

5. The receiver of claim 2, wherein the emergency message output by said output driver comprises an alarm sound.

6. The receiver of claim 2, wherein the specific area codes of said specific area message encoding table are designated by the National Weather Service.

7. The receiver of claim 2, wherein said area automatic selection receiver is free from a transmitter unit.

* * * * *